United States Patent
Sandkleiva

(10) Patent No.: US 6,585,481 B1
(45) Date of Patent: Jul. 1, 2003

(54) PAINT PUMPING DEVICE

(75) Inventor: Are Sandkleiva, Kvernaland (NO)

(73) Assignee: ABB Flexible Automation AS, Bryne (NO)

( * ) Notice: Subject to any disclaimer, the term of this patent is extended or adjusted under 35 U.S.C. 154(b) by 0 days.

(21) Appl. No.: 09/743,763

(22) PCT Filed: Jun. 21, 1999

(86) PCT No.: PCT/IB99/01158

§ 371 (c)(1), (2), (4) Date: Jun. 5, 2001

(87) PCT Pub. No.: WO00/03813

PCT Pub. Date: Jan. 27, 2000

(30) Foreign Application Priority Data

Jul. 16, 1998 (SE) .................................................. 9802556

(51) Int. Cl.⁷ .................................................. F01D 11/00
(52) U.S. Cl. ........................ 415/112; 415/175; 415/230; 417/423.11
(58) Field of Search .................. 415/112, 111, 415/113, 175, 174.2, 230, 231, 216.1; 417/423.11

(56) References Cited

U.S. PATENT DOCUMENTS

| 2,375,085 A | * | 5/1945 | Curtis |
| 2,600,879 A | * | 6/1952 | Karlberg |
| 2,712,741 A | * | 7/1955 | Roller |
| 3,515,394 A | * | 6/1970 | Stevens |
| 3,791,773 A | * | 2/1974 | Maginnis .................... 417/42.6 |
| 4,060,178 A | * | 11/1977 | Miller .......................... 222/14 |
| 4,114,564 A | * | 9/1978 | Probst ........................ 118/626 |
| 4,335,888 A | | 6/1982 | Ohba et al. ................. 277/96.1 |
| 4,787,332 A | | 11/1988 | Geisel et al. ................ 118/692 |
| 4,826,402 A | * | 5/1989 | Nachtrieb .................... 415/206 |
| 5,501,471 A | | 3/1996 | Ohba et al. ................. 277/96.1 |
| 5,785,510 A | * | 7/1998 | Altieri, Jr. et al. .......... 418/104 |
| 5,967,426 A | * | 10/1999 | McLeod ...................... 239/662 |
| 6,234,748 B1 | * | 5/2001 | Brown et al. ............. 415/170.1 |
| 6,270,831 B2 | * | 8/2001 | Kumar et al. .............. 427/2.24 |
| 6,338,906 B1 | * | 1/2002 | Ritland et al. ........... 428/539.5 |

FOREIGN PATENT DOCUMENTS

GB 2 285 101 A 6/1995

* cited by examiner

Primary Examiner—Edward K. Look
Assistant Examiner—James M. McAleenan
(74) Attorney, Agent, or Firm—Connolly Bove Lodge & Hutz LLP; Larry J. Hume

(57) ABSTRACT

A device for pumping paint includes a pump house adapted to receive paint from a paint source, a pump shaft for driving a pump member to rotate inside the house for pumping paint therethrough. The pump shaft is connected to an output shaft of a motor arranged outside the pump house through an intermediate shaft piece through a wall of the pump house. The motor is arranged to drive the pump shaft and the pump member. A sealing member is arranged to counteract paint leaking out of the pump housing along the pump shaft. The sealing member is arranged to seal by bearing substantially axially against substantially axial surfaces of the pump shaft around the pump shaft, in which the sealing member and/or these axial surfaces are preferably of a ceramic material.

19 Claims, 1 Drawing Sheet

PAINT PUMPING DEVICE

FIELD OF THE INVENTION AND PRIOR ART

The present invention relates to a device for pumping paint comprising a pump house adapted to receive paint from a paint source, a pump shaft for driving a pump member to rotate inside the house for pumping paint therethrough, said pump shaft being connected to an output shaft of a motor located outside the pump house through an intermediate shaft piece through a wall of the pump house, said motor being arranged to drive the pump shaft and thereby the pump member, as well as a sealing member adapted to counteract leakage of paint out from the pump house along the pump shaft.

"Paint" is here to be interpreted broadly and comprises all types of paints, with a colour as well as colourless ones, and with arbitrary bases, for example on solvent or water base.

Devices of this type are used for example for pumping paint to a spray nozzle for application of paint on an object, in which this pumping often takes place at a well defined dosing. In order to exemplify but not in any way restrict the invention it may be mentioned that pumps of this type, preferably gear pumps, are used for dosed paint feeding to spray nozzles of robots for spray application of paint on vehicle bodies and suchlike.

Paints have quite particular properties, which put quite particular demands on said sealing members of a device defined in the introduction. It is very important that this sealing member achieves a good sealing, since paint leaking may solidify and constitute a resistance against the rotation of the shafts or even prevent such a movement due to sticking of parts together when the pump does not move. Furthermore, paint leaking out from the pump house may be difficult and unpleasant to take care of. Different sealing members, which seals radially against the pump shaft have been suggested for this type of pumping devices for closing very tight against the pump shaft, but these sealing members have, to the extent that they have succeeded to obtain a sufficient degree of sealing, a too high friction against the pump shaft or surrounding parts of the wall of the pump house, depending upon whether they are non-rotating or rotate with the pump shaft, which has led to unnecessary energy losses, at the same time as the sealing member or the washer gets a shorter life time. The sealing members already known are then not so durable and excerted to wear as desired.

It may be mentioned that such sealing members are usually constituted by packing boxes or lip packings bearing against the pump shaft in the radial direction. These have a comparatively high friction and a too large leakage combined with a short life-time. Furthermore, the packing boxes require readjustment. Another disadvantage of the sealing members already known is that the structural material thereof cannot stand that paint particles come in between the sealing surfaces without degradation thereof.

SUMMARY OF THE INVENTION

The object of the present invention is to provide a device of the type defined in the introduction, which has a sealing, in which the disadvantages mentioned above of pumping devices already known are considerably reduced.

This object is according to the invention obtained by arranging the sealing member of such a device to bear sealingly in substantially axial direction against substantially axial surfaces of the pump shaft around this shaft, and that at least the sealing member or the axial surfaces are of a ceramic material.

By constructing at least one of the surfaces bearing against each other and the sealing member of a ceramic material a low friction between the sealing member and the parts moving with respect thereto may be obtained, so that a low motor power will be needed. An additional advantage of such a sealing is that the ceramic material may resist paint particles entering between the sealing surfaces while not being destroyed in any way. In the case that the sealing member is of a ceramic material it will be very durable to wear and according gets a long lifetime, and no readjustments are required either. Furthermore, a desired good tightness around the pump shaft is obtained.

According to a preferred embodiment of the invention the sealing member and the axial surfaces are of a ceramic material. This amplifies the advantages of the invention mentioned above.

According to another preferred embodiment of the invention said substantially axial surfaces are arranged on a portion of the pump shaft having an enlarged cross section and directed substantially in the direction of the pump shaft away from the pump house. The ceramic sealing member may in this way be comfortably arranged while carrying out an axial sealing action.

According to another preferred embodiment of the invention the device comprises members adapted to keep the sealing member pressed while bearing under pretension against said substantially axial surfaces. Thanks to the arrangement of such a pressing member, which according to another preferred embodiment of the invention may be a spring element, an optimum sealing function is obtained.

According to another preferred embodiment of the invention the device comprises members for radial pressing under pretension of the sealing member against the pump shaft, and according to a further development of this embodiment said member for radial pressing under pretension is an O-ring pretensioned by being arranged around the sealing member stretched with respect to a rest position. The axial sealing is in this advantageous way supplemented by a radial sealing with respect to the pump shaft under low friction.

According to another preferred embodiment of the invention said pump house wall has a space carried out in the direction of the pump shaft from the pump house towards the output shaft of the motor downstream of the sealing member, and a member is adapted to bring a lubricant, such as oil, to flow into, through and out of this space for flushing away or preventing a binding action on parts of the pump shaft and the house wall being movable with respect to each other of paint entering the space as a consequence of leakage from the pump house past the sealing member. It may hereby be prevented that paint solidifies and binds parts movable with respect to each other together and in such a way will cause shut down, at the same time as the lubricant applied will reduce the wear on such parts.

According to another preferred embodiment of the invention the device is adapted for dosed pumping of paint, and more particularly for dosed pumping of paint to a spray nozzle for spray application of paint on objects, which is a very advantageous application of the device according to the invention.

According to yet another preferred embodiment of the invention the device comprises a gear pump, which is the type of pump that has turned out to be the most advantageous for exactly dosed feeding of paint for spray application while maintaining shearing forces acting upon the paint on an acceptably low level.

Further advantages as well as advantageous features of the invention appear from the following description and the other dependent claims.

BRIEF DESCRIPTION OF THE DRAWINGS

With reference to the appended drawings, below follows a description of a preferred embodiment of the invention cited as an example.

In the drawings.

DETAILED DESCRIPTION OF A PREFERRED EMBODIMENT OF THE INVENTION

Figure 1:
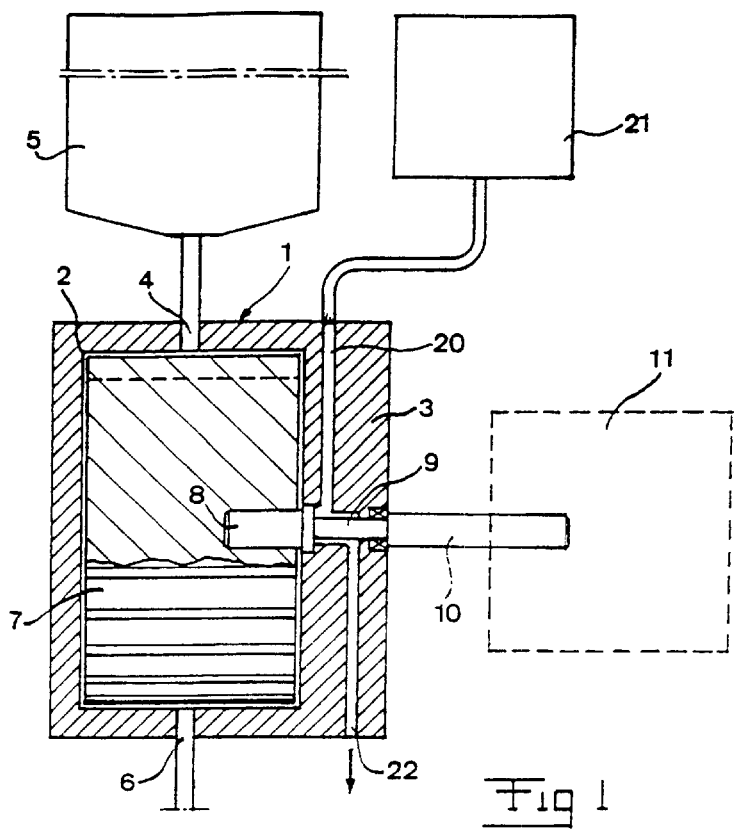
FIG. 1 is a very schematic, partially sectioned view of a pumping device according to a preferred embodiment of the invention.

The general construction of a device for dosed pumping of paint is schematically illustrated in FIG. 1, and this device comprises a pump house 1 having a pump house wall 3 delimiting an inner space 2. The inner space 2 has an inlet 4 through the wall 3 for paint connected to a paint source 5 and an outlet 6 for paint pumped out of the pump house for example to a spray nozzle (not shown). A pump member 7 in the form of a gear is arranged inside the inner space 2 of the pump house, may be rotated and is connected to a pump shaft 8, which is connected to an output shaft 10 of a motor 11 through an intermediate shaft piece 9 through the pump house wall 3, said motor being adapted to drive the pump shaft 8 and thereby the gear 7 to rotate for dosed pumping of paint from the paint source 5 to a spray nozzle or the like downstream of the outlet 6. The description so far covers conventional technique of gear pumps for dosed feeding of paint.

Figure 2:
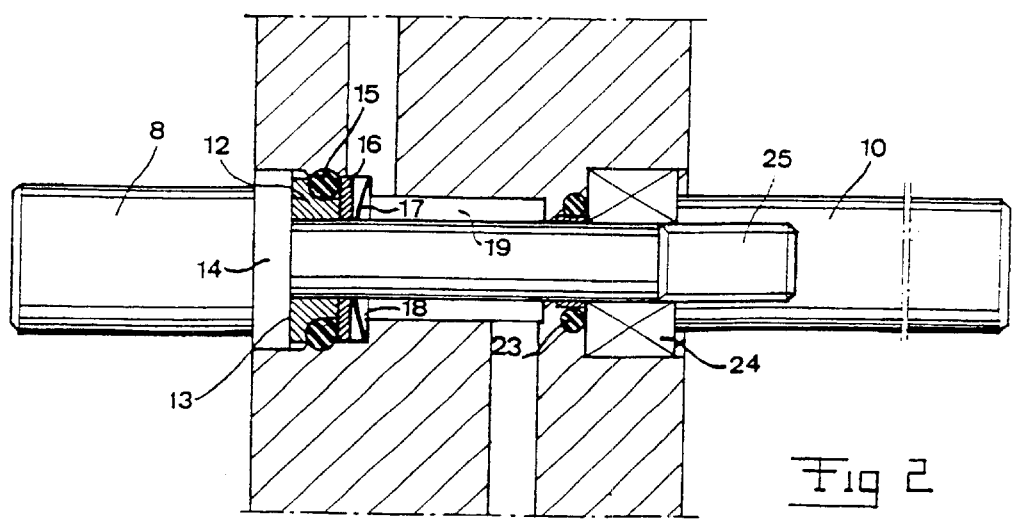
FIG. 2 is a partially sectioned detail view of a part of the device shown in FIG. 1.

Reference is now made also to FIG. 2. The device has also a sealing member 12 of a ceramic material, which is adapted to counteract that paint leaks out from the pump house along the pump shaft and it is for this sake sealingly bearing substantially axially against substantially axial surfaces 13 of the pump shaft around this shaft, in which said substantially axial surfaces are arranged on a portion 14 of the pump shaft having an enlarged cross section and are directed substantially in the direction of the pump shaft away from the pump house.

Furthermore, a conventional O-ring 15 of rubber is arranged to bear under pretension circumferentially outside and against the sealing member 12 so as to press this to bear while sealing radially against the pump shaft 8.

A plate 16 of stainless steel is arranged around the pump shaft 8 and influenced in the axial direction against the sealing member 12 for pressing it to bear axially sealingly against said surfaces 13 through a spring element 17, which acts between support surfaces 18 and the plate 16 so as to deliver potential energy by pushing the plate to the left as seen in FIG. 2. A strong, constant force in substantially axial direction upon the sealing member 12 is obtained by the arrangement of the spring element.

The pump house wall 3 has also a space 19 carried out in the direction of the pump shaft from the pump house towards the output shaft of the motor downstream of the sealing member 12, which is connected to the member 21 for supply of a lubricant, such as oil, through an inlet conduit 20, to the space 19, therethrough and out thereof through an outlet conduit 22. The purpose of the oil supplied in this way is to reduce wear between stationary and rotating parts and ensure that paint, that after all passes the sealing member 12 or is gathered at sealing surfaces thereof, does not bind different parts to each other in connection with a period of rest of the pump.

The device has also a radial rod sealing 23 arranged in the direction from the pump house towards the shaft 10 of the motor downstream of the space 19 and adapted to ensure that oil in the space 19 does not go further out through the pump house wall to the outlet shaft of the motor. Furthermore, the outlet shaft of the motor is journalled in double axial ball bearings 24 in the pump house wall. The shaft 10 of the motor is at 25 screwed to the pump shaft.

The function of the device according to this embodiment appears from the discussion above, but it may be added that the ceramic sealing 12 will obtain a good axial sealing against the surfaces 13 while simultaneously achieving low friction when the pump shaft is rotating and a long life time of the sealing without any demands of readjustments.

The invention is of course not in any way restricted to the preferred embodiment described above, but many possibilities to modifications thereof will be apparent to a man skilled in the art without departing from the basic idea of the invention such as defined in the claims.

It is possible that the axial surfaces of the pump shaft are of a ceramic material, for example by gluing a ceramic ring on the pump shaft, so that the wear surfaces will be ceramic against ceramic. Another possibility consists in forming the axial surfaces by a ceramic ring on the pump shaft and have a sealing member of a non-ceramic material. The ring on the pump shaft is then preferably arranged between the portions 14 of the pump shaft and the sealing member.

It is pointed out that "substantially axial surfaces of the pump shaft" in the claims also are intended to comprise the case of axial surfaces provided by a ring of another material than the pump shaft (or of the same material as this) secured to or arranged thereon.

It would for example be possible to arrange the ceramic sealing member in another place along the shaft, and that said surfaces are substantially axially directed indicates that the normal thereof could have a component also in the direction perpendicular to the shaft in question.

The patent claim definition "the pump shaft is through an intermediate shaft piece . . . connected to an output shaft" is to be given a broad sense and is also intended to comprise the case that one single rigid shaft forms the pump shaft as well as the intermediate shaft piece and the output shaft or the shaft on the pump side are directly rigidly connected to a shaft on the motor side. That the motor is arranged outside the pump house means that it is arranged outside the house wall delimiting the pump space, but it may very well be arranged in a space directly adjoining to this house wall and entirely or partially closed and partially defined by this wall.

What is claimed is:

1. A device for pumping paint, comprising:
    a pump house adapted to receive paint from a paint source;
    a pump shaft which drives a gear pump to rotate inside the house for pumping paint therethrough,
    said pump shaft being connected to an output shaft of a motor located outside the pump house through an intermediate shaft piece through a wall of the pump house,
    said motor being arranged to drive the pump shaft and thereby the gear pump, as well as a sealing member adapted to counteract leakage of paint out from the pump house along the pump shaft, wherein the sealing member is arranged to bear sealingly in a substantially axial direction against substantially axial surfaces of the pump shaft around the pump shaft, and wherein at least the sealing member or the axial surfaces comprise a ceramic material.

2. The device of claim 1, wherein the sealing member and the axial surfaces comprise a ceramic material.

3. A device according to claim 2, wherein said substantially axial surfaces are arranged on a portion of the pump shaft with an enlarged cross section and directed substantially in the direction of the pump shaft away from the pump house.

4. The device of claim 2, further comprising members adapted to hold the sealing member pressed while bearing under pre-tension against said substantially axial surfaces.

5. The device of claim 2, further comprising members for pressing the sealing member radially under pre-tension against the pump shaft.

6. The device of claim 1, wherein said substantially axial surfaces are arranged on a portion of the pump shaft with an enlarged cross section and directed substantially in the direction of the pump shaft away from the pump house.

7. The device of claim 6, further comprising members adapted to hold the sealing member pressed while bearing under pre-tension against said substantially axial surfaces.

8. The device of claim 6, further comprising members for pressing the sealing member radially under pre-tension against the pump shaft.

9. The device of claim 1, further comprising members adapted to hold the sealing member pressed while bearing under a pre-tension against said substantially axial surfaces.

10. The device of claim 9, further comprising members for pressing the sealing member radially under pre-tension against the pump shaft.

11. The device of claim 9, wherein said pressing member comprises a spring element.

12. The device of claim 11, wherein said spring element is adapted to act substantially axially upon an axially moveable plate adapted to press the sealing member substantially axially against substantially axial surfaces therethrough.

13. The device of claim 12, wherein said plate comprises stainless steel.

14. The device of claim 11, further comprising members for pressing the sealing member radially under pre-tension against the pump shaft.

15. The device of claim 1, further comprising members for pressing the sealing member radially under pre-tension against the pump shaft.

16. The device of claim 1, wherein the device is adapted for dosed pumping of paint.

17. A device for pumping paint, comprising:

a pump house adapted to receive paint from a paint source;

a pump shaft for driving a pump member to rotate inside the house for pumping paint therethrough; and members for pressing the sealing member radially under pre-tension against the pump shaft, said pump shaft being connected to an output shaft of a motor located outside the pump house through an intermediate shaft piece through a wall of the pump house, said motor being arranged to drive the pump shaft and thereby the pump member, as well as a sealing member adapted to counteract leakage of paint out from the pump house along the pump shaft, wherein the sealing member is arranged to bear sealingly in a substantially axial direction against substantially axial surfaces of the pump shaft around the pump shaft, wherein at least the sealing member or the axial surfaces are of a ceramic material, and wherein said members for radial pressing under the pre-tension comprise an O-ring pretensioned by being arranged around the sealing member in a state stretched with respect to a rest position.

18. A device for pumping paint, comprising:

a pump house adapted to receive paint from a paint source;

a pump shaft for driving a pump member to rotate inside the house for pumping paint therethrough, said pump shaft being connected to an output shaft of a motor located outside the pump house through an intermediate shaft piece through a wall of the pump house, said motor being arranged to drive the pump shaft and thereby the pump member, as well as a sealing member adapted to counteract leakage of paint out from the pump house along the pump shaft, wherein the sealing member is arranged to bear sealingly in a substantially axial direction against substantially axial surfaces of the pump shaft around the pump shaft, wherein at least the sealing member or the axial surfaces are of a ceramic material, wherein said wall of the pump house has a space arranged in the direction of the pump shaft from the pump house towards the output shaft of the motor, downstream of the sealing member, wherein a member is adapted to bring a lubricant to flow into, through, and out of the space to prevent a binding action between mutually movable parts of the pump shaft and the wall of the pump house due to paint entering the space as a consequence of leakage from the pump house past the sealing member.

19. A device for pumping paint, comprising:

a pump house adapted to receive paint from a paint source;

a pump shaft for driving a pump member to rotate inside the house for pumping paint therethrough, said pump shaft being connected to an output shaft of a motor located outside the pump house through an intermediate shaft piece through a wall of the pump house, said motor being arranged to drive the pump shaft and thereby the pump member, as well as a sealing member adapted to counteract leakage of paint out from the pump house along the pump shaft, wherein the sealing member is arranged to bear sealingly in a substantially axial direction against substantially axial surfaces of the pump shaft around the pump shaft, wherein at least the sealing member or the axial surfaces are of a ceramic material, wherein the device is adapted for dosed pumping of paint to a spray nozzle for spray application of paint on objects.

* * * * *